Mar. 5, 1929.  J. A. McGREW  1,703,942
GEARING
Filed Nov. 17, 1927   2 Sheets-Sheet 1
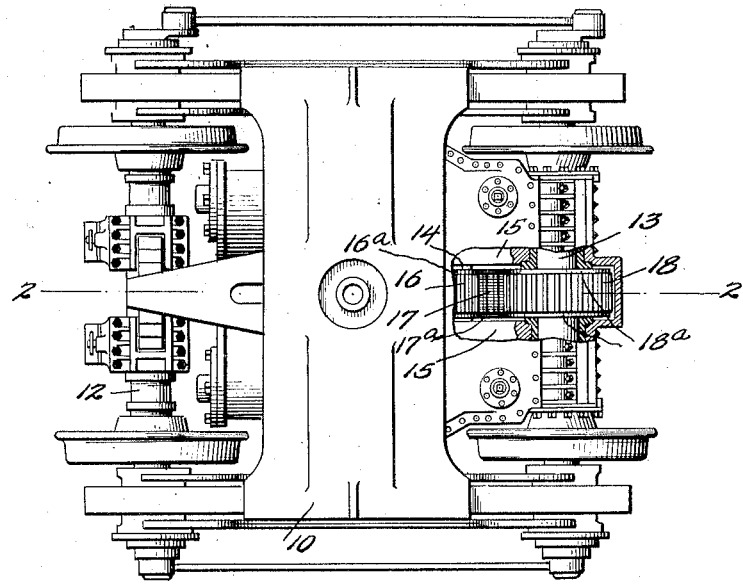
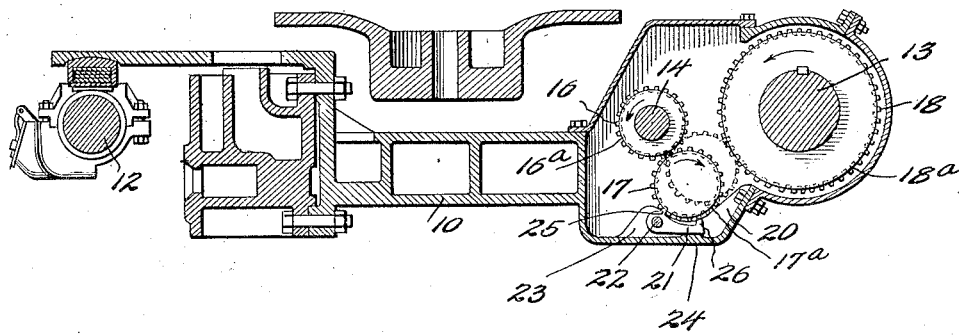
Inventor
John A. McGrew,
By Watson, Coit, Morse & Grindle
Attorney Mar. 5, 1929.  J. A. McGREW  1,703,942
GEARING
Filed Nov. 17, 1927  2 Sheets-Sheet 2
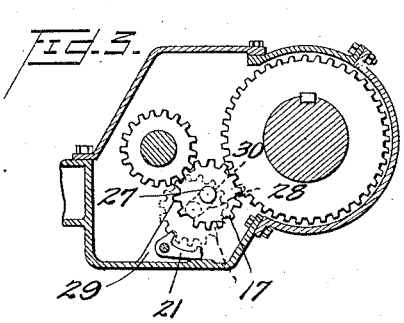
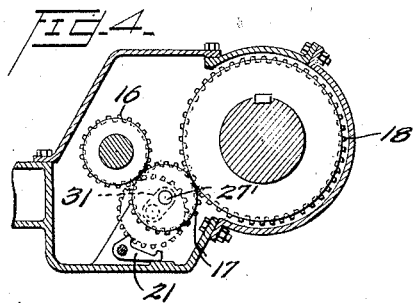
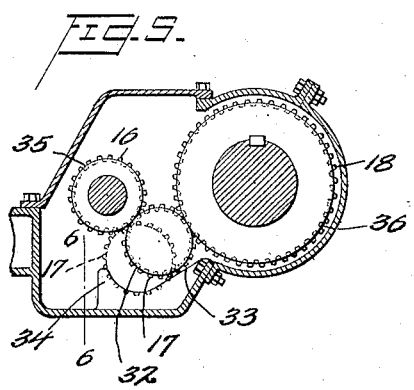
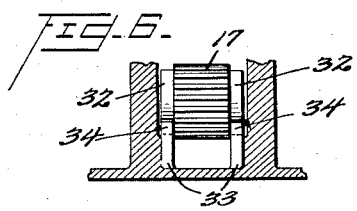
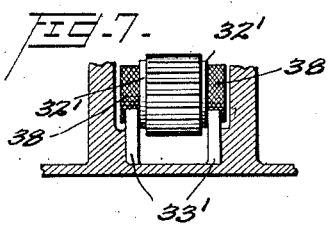
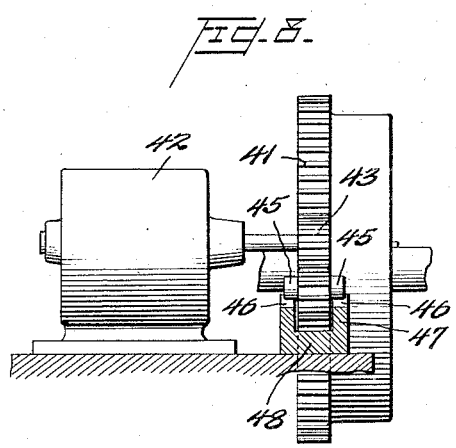
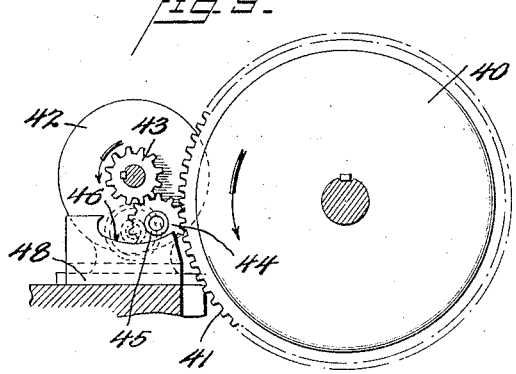
Inventor
John A. McGrew,
By Watson, Coit, Morse & Gindle
Attorney Patented Mar. 5, 1929.

1,703,942

UNITED STATES PATENT OFFICE.

JOHN A. McGREW, OF ALBANY, NEW YORK, ASSIGNOR TO BETHLEHEM STEEL COMPANY, A CORPORATION OF PENNSYLVANIA.

GEARING.

Application filed November 17, 1927. Serial No. 234,010.

The present invention relates to gearing, and particularly to gearing of the tumbler type, and it has for an object to provide apparatus of this character which shall be of simple and rugged type from the standpoint of mechanical construction and reliable in operation.

The gearing which forms the subject matter of the present invention is of general utility and well adapted for many uses as for instance in connection with auxiliary propulsion units for steam railroads and starting mechanisms for internal combustion engines. When used in connection with either an auxiliary propulsion unit or internal combustion engine starting mechanism it is found to be sturdy, reliable and capable of operating through long periods of time with little attention. Its extreme simplicity, small bulk and low cost renders it suitable for use with various other types of machines, as will be apparent.

In the accompanying drawings the invention is illustrated as incorporated in each of the two above mentioned types of mechanical appliances but it will be understood that, without substantial alteration, it may be employed elsewhere or wherever it is found necessary to provide automatic means for temporarily establishing a positive driving connection between a power shaft and a driven shaft and automatically breaking such connection when the driven shaft attains a certain speed of revolution or when the drive shaft ceases to rotate.

In addition, several views show the improved gearing slightly modified in various ways to suit various operating conditions. It will be understood however that these various forms are set forth by way of example only, the invention not being limited strictly thereto since still additional forms may be designed or suggested without departure from the spirit of the invention.

Fig. 1 is a plan view of a motorized truck, or a truck upon which a steam driven auxiliary engine is supported, my improved gearing being shown as applied thereto for the purpose of temporarily connecting the auxiliary propulsion unit with one of the truck supporting axles.

Figure 2 is a section on line 2—2 of Figure 1.

Figure 3 is a section taken on a line such as 2—2 of Figure 1 through that portion of the truck in which is located my improved gearing, but disclosing a form of gearing which differs slightly from that shown in Figure 2.

Figures 4 and 5 are views similar to Figure 3, by illustrating still further modified forms of gearing.

Figure 6 is a section on line 6—6 of Figure 5 but omitting portions of the gearing, the purpose being to illustrate principally the tumbler gear.

Figure 7 is a similar view showing such modified form of tumbler gear.

Figure 8 is a side view of a portion of an internal combustion engine, showing the starting motor and gearing.

Figure 9 is an end view of the same.

Referring first to Figures 1 to 7 inclusive. The frame of the motorized truck is indicated at 10 and the load bearing axles at 12 and 13 respectively. Upon the frame and axles is supported the propulsion unit for a more complete disclosure of which reference may be had to Patent No. 1,412,250 granted April 11, 1922 to J. T. Loree and myself. The motors or engines drive a crank shaft 14 journaled in bearings 15 carried by the frame 10. The load bearing axle 13 is also journaled in bearings 15 carried by the frame. The crank shaft 14 has connected thereto a driving gear 16 which constantly meshes with a floating tumbler 17 movable to its meshed and demeshed positions with respect to the driven gear 18 fixed on the load bearing axle 13. The tumbler gear 17 is of the floating type and has its axis positioned below the axes of the driving and driven gears 16 and 18 respectively. As shown in the drawings the floating tumbler gear 17 is in no way connected by a pivoted frame or rocker to the truck frame or to the driving or crank shaft 14, such tumbler gear being preferably of the full floating type and guided to meshed and demeshed positions by means entirely independent of the shafts which it is adapted to connect, as for instance by stationary guide means 20 carried by the truck frame.

As shown in Figure 2, the guide means 20 extends from below the driving gear 16 upwardly toward the driven gear 18 and this guide means is so shaped and positioned that when the tumbler gear is in its demeshed position as shown in Figure 2, the teeth thereof will be only partially meshed with the teeth of the driving gear 16. The guide means is so formed as to guide the tumbler gear 17, when the latter is moved toward the driven gear, until the teeth thereof are partially enmeshed with the teeth of the driven gear 18 whereupon, due to tooth pressure alone, the tumbler gear will be thrown completely into mesh with the driving and driven gears 16 and 18 respectively and will be lifted out of contact with the guide means 20.

In order to assure movement of the tumbler gear 17 in a meshing direction with respect to the driven gear 18 when the driving gear 16 is moved in the direction of the arrow with that form of the invention disclosed in Figures 1 and 2, I provide means to positively prevent idle rotation or spinning of the tumbler gear when the drive gear initially starts to rotate. For performing this function I provide an escapement or detent device 21 pivoted at 22 upon the upwardly extending lugs 23 carried by the bottom of the gear case 24 of the frame, the escapement 21 being provided with teeth 25 and 26 adapted to engage respectively between the teeth of the tumbler gear 17.

With the tumbler gear 17 in its demeshed position, as shown in Figure 2, the tooth 25 of the escapement projects between two adjacent teeth of the tumbler, the forward tooth 26 of the escapement being out of contact with the teeth of the gear. Upon actuation of the driving gear in the direction of the arrow the tumbler moves forwardly, the tooth 25 preventing rotation or spinning of the tumbler gear 17 idly about its axis, acting somewhat in the manner of a rack tooth, and causing the tumbler gear 17 to move abruptly toward the driven gear. As the tumbler also rests against the guide means 20, it is guided thereby directly in a meshing direction. As it moves the escapement 21 is caused to pivot thereby about its axis 22 thereby swinging its forward tooth 26 upwardly into the path of movement of the teeth of the tumbler gear, between two of the teeth of which it projects as the tumbler gear moves thereacross, to prevent spinning or idle rotation of the tumbler after it leaves the rearward tooth 25. The escapement is preferably so designed that the forward tooth 26 thereof shall assure positive translatory movement of the tumbler gear 17 until the teeth thereof are partially enmeshed with the teeth of the driven gear 18. When so partially enmeshed with the driven gear it will be apparent that the tumbler gear will be forcibly driven into complete mesh with both the drive and driven gears, wholly due to tooth pressure.

The guide means 20 is preferably so designed and the escapement 21 is preferably so arranged that when the tumbler gear is in its demeshed position the teeth thereof are only partially meshed with the driving gear 16 and the guide means 20 is preferably so arranged that this condition of partial enmeshment of the driving and tumbler gears is maintained until the tumbler is partially enmeshed with the driven gear whereupon, due to tooth pressure, complete enmeshment of the tumbler with both driving and driven gears follows.

In the form of the invention illustrated in Figures 1 and 2 the guide means takes the form of upwardly curved spaced surfaces provided by stationary structures arranged within the gear case 24. If desired I may provide means for preventing undue crowding of the tumbler gear in between the driving and driven gears. Such crowding may be effectively prevented by providing gears 16, 17 and 18 with shrouds such as $16^a$, $17^a$ and $18^a$ extending to their pitch circles. These shrouds have rolling contact when the gears are completely meshed.

In the forms of my invention shown in Figures 3 and 4, the tumbler gear 17 is provided with trunnions adapted to move on suitable stationary guides for the purpose of guiding the tumbler gear in its movements. In Figure 3 I show the tumbler gear 17 as having trunnions 27 which extend into slots 28 carried by structure 29 which last mentioned structure is supported upon the truck frame. The slots 28 are arranged below the axes of the driving and driven gears 16 and 18 which slots incline forwardly and upwardly from its lower end toward the driven gear 18. The lower ends of the slots 28 defining the lower limit of the movement of the tumbler gear 17. The upper ends 30 of slots 28 form bearings for the trunnions 27 when the tumbler gear is in its uppermost positions that is, when the trunnions 27 have reached the upper ends of slots 28 the tumbler gear 17 is in full mesh with the driving and driven gears.

When the tumbler gear 17 is in its demeshed position, a detent 21 cooperates therewith in the same manner as has already been described in connection with the gearing shown in Figures 1 and 2. The slots 28 can be so arranged that, when the tumbler 17 is in its demeshed position the teeth thereof are only partially meshed with the driving gear 16 and the slots 28 extend upwardly toward the driven gear so as to assure that the teeth of the tumbler gear shall be partially enmeshed with the driven gear whereupon, due to tooth pressure, the tumbler gear 17 will be completely enmeshed with the driving gear and with the driven gear, this resultant enmeshment movement of the tumbler gear causing its trunnions to rest against the upper ends of the slots. With this form of gearing it is unnecessary to provide the gears with shrouds, the bearing portions 30 of the slots 28 and the trunnions 27 cooperating to actually limit the upward movement of the tumbler gear 17 and to thereby avoid crowding of the tumbler gear against the driving and driven gears.

In Figure 4, I show a form of my invention which is similar to that shown in Figure 3, except that slots 31 for cooperation with trunnions 27' of the tumbler gear 17 are different in that they are wider. The lower ends of the these slots serve to support trunnions 27' when the tumbler gear 17' is inoperative. The trunnions have sufficient play in the slots 31 and the latter are so designed that, when the tumbler gear 17 is in its demeshed position, the teeth of such tumbler gear are only partially meshed with the teeth of the driving gear 16; while the slots 31 serve to guide the tumbler gear toward the driven gear 18 until the tumbler gear partially meshes with the teeth of such driven gear, whereupon, at that instant, the tumbler gear will be partially meshed both with the driving gear 16 and the driven gear 18. The slots 31 provide sufficient play for the trunnions 27' so that, when this condition of partial enmeshment of the tumbler gear with both gears takes place, the tumbler gear will then be completely meshed with both the driving and with the driven gears due wholly to tooth pressure. In order to positively assure translatory movement of the pinion 17 in a meshing direction, I provide a detent 21 for cooperation with the tumbler gear 17 in Figure 4, such detent functioning in the manner already set forth in the description of the operation of the gearing of Figure 3. Since the trunnions 27' do not fit bearing portions to resist crowding of the tumbler gear 17 with respect to the driving gear 16 and the driven gear 18, all of such gears are preferably shrouded as in the form of gearing shown in Fig. 2.

In the embodiment of my invention shown in Figs. 5 and 6, the shrouded portions 32 of the tumbler gear 17 are made relatively long and cooperate with lateral guides 33 carried by the truck frame structure. These guides are formed with portions 34 at their lower ends which cooperate to hold the floating tumbler gear 17 in its demeshed position, as indicated in dotted lines in Figure 5. The guides 33 extend upwardly toward the driven gear 18 so that the tumbler gear 17 may be brought into meshing relation with respect thereto. The guide members 33 are so shaped that the tumbler gear 17 shall be brought to a position where it partially meshes with the driving gear 16 and with the driven gear 18, whereupon the tooth pressure results in the tumbler gear being brought into complete mesh with the driving and with the driven gears, the shrouded members 32 carried by the tumbler gear cooperating with shrouded members 35 and 36 on the driving gear 16 and the driven gear 18, respectively, to limit or prevent crowding. In this form of my invention, friction of the shrouded members 32 upon the guides 33 is relied upon to cause the tumbler gear 17 to travel upwardly of the guides toward the driven gear 18 when the driving gear 16 is actuated.

In the form of my invention shown in Figure 7, I provide friction surfaces 38 arranged beyond the shrouds 32' which may be smaller in diameter than the latter, the friction surfaces 38 and the complementary surfaces on the guides being roughened in any suitable manner to assure that the tumbler gear 17 shall be rolled up the guides 33' to mesh with the driven gear.

The novel gearing may be readily incorporated in an internal combustion engine starting mechanism and in Figures 8 and 9 such a mechanism is disclosed. The fly wheel of the engine is indicated at 40, and is shown to be toothed, as at 41. A starting motor of usual type is indicated at 42 and the starting pinion at 43. The tumbler gear 44 is provided with trunnions 45 which run on spaced curved guide surfaces 46 formed on the tops of upright flanges 47 of the horizontally extending channel member 48. The action of the tumbler gear is substantially the same as in the case of the gears shown in the preceding figures but it has been found in actual practice that the use of detents or friction surfaces on the trunnions is unnecessary, the rapidly spinning starting pinion throwing the tumbler gear into mesh immediately and without difficulty, although no means for retarding its spinning is provided.

As soon as the internal combustion engine starts the fly wheel of course throws out the tumbler because its peripheral speed is greater than that of the starting pinion, and the current supply to the starting motor is interrupted. The motor 42 and guide 48 are suitably secured to the frame upon which the engine is supported.

From the foregoing, it will be apparent that I have devised tumbler gearing which is characterized by the presence of a tumbler gear located below the axes of the driving and driven gears in combination with guide means extending upwardly toward the driven gear, so that, when the driving gear is inactive, gravity is effective to maintain the tumbler gear out of mesh with the driven gear. Also, since the tumbler gear is of the floating type and no guide or supporting frames are necessary, the mechanism is simplified and space is economized. In a motorized truck of the character referred to, economy of space is a very important factor and by the present simplified arrangement of gearing and by having the floating tumbler gear below the driving and the driven gears, it is assured that more space may be provided at the upper side of the truck for certain of the truck parts. This is also true, of course, where the gearing is used in connection with an automobile engine starting mechanism.

While I have shown my invention in a plurality of forms, it will be obvious to those skilled in the art that it is not so limited, but is susceptible of various other changes and modifications without departing from the spirit thereof, and I desire, therefore, that only such limitations shall be placed thereupon as are imposed by the prior art or as are specifically set forth in the appended claims.

Having thus described the invention, what is claimed as new and desired to be secured by Letters Patent is:

1. Gearing comprising in combination, a driving gear, a driven gear, a tumbler gear in constant mesh with the drive gear and movable into and out of mesh with the driven gear, and means for guiding the tumbler to a position of partial enmeshment with the driven gear when the driving gear is actuated, whereupon the tumbler and driven gears are completely meshed due to tooth pressures and the tumbler gear is withdrawn from the guide means.

2. Gearing comprising in combination, a frame, driving and driven shafts mounted in the frame, driving and driven gears carried by said shafts respectively, a tumbler gear having its axis arranged below the axes of the driving and driven gears and in constant mesh with the driving gear, said tumbler being movable into and out of mesh with the driven gear, means carried by the frame for guiding the tumbler gear upwardly toward the driven gear when the tumbler gear moves in a direction to mesh with the driven gear and to receive the tumbler gear when it moves out of mesh with the driven gear, said guide means being constructed to guide the tumbler gear to a position of partial enmeshment with the driven gear so that the two last mentioned gears are fully meshed by tooth pressures and the tumbler is removed from the guide means.

3. The combination set forth in claim 2 in which means is provided in association with the tumbler gear for bringing about a movement thereof toward the driven gear upon activation of the drive gear.

4. In a gearing, the combination with driving, driven and tumbler gears of means for supporting the tumbler gear at all times in mesh with the driving gear and for guiding it toward the driven gear when the driving gear is actuated, the arrangement being such that the complete meshing of the tumbler and driven gears is effected by tooth pressure, the tumbler gear being completely withdrawn from the supporting and guiding means when in full mesh with the driven gear.

5. The combination set forth in claim 4 in which the supporting means is positioned beneath the driving gear and has a portion extending toward the driven gear.

6. The combination claimed in claim 4 in which the supporting means provides a guide surface for the tumbler gear, said surfaces being positioned below the drive gear and inclining upwardly toward the driven gear.

7. The combination set forth in claim 4 in which the tumbler gear has a cylindrical portion on each side of its central toothed portion, said end portions comprising trunnions, and in which the guide means comprises spaced parallel members each of which has a guide surface to receive the corresponding trunnion.

8. In a gearing, the combination with driving, driven and tumbler gears of means for supporting the tumbler gear at all times in mesh with the driving gear and for guiding it toward the driven gear when the driving gear is actuated, the arrangement being such that the complete meshing of the tumbler and driven gears is effected by tooth pressure, the tumbler gear being completely withdrawn from the supporting and guiding means when in full mesh with the driven gear, and means for initially retarding rotation of the tumbler gear about its axis upon initial movement of the driving gear for insuring prompt movement of the tumbler gear toward the driven gear when the driving gear is actuated.

9. The combination set forth in claim 8 in which said last mentioned means is a friction means.

10. The combination set forth in claim 8 in which said last mentioned means frictionally retards rotation of the tumbler about its axis prior to the time when the tumbler is in mesh with the driven gear, which means becomes ineffective upon meshing of the tumbler and driven gears.

11. In a gear, the combination with drive, driven and tumbler gears of means for supporting the tumbler gear at all times in mesh with the driving gear and for guiding it toward the driven gear when the driving gear is actuated, said supporting means comprising spaced parallel members having guide surfaces formed thereon and the tumbler gear having cylindrical end portions on each side of the central toothed portion adapted to roll on said guide surfaces, the cylindrical end portions of the tumbler or the guide surfaces of the guide means being roughened to retard slippage between such mutually engaged surfaces when the driving gear is first actuated for the purpose set forth.

12. In a gear, the combination with driving, driven and tumbler gears of means for supporting the tumbler gear at all times in mesh with the driving gear and for guiding it toward the driven gear when the driving gear is actuated, the arrangement being such that the complete meshing of the tumbler and driven gears is effected by tooth pressure, the tumbler gear being completely withdrawn from the supporting and guiding means when in full mesh with the driven gear, and all of said gears being provided with shrouds for the purpose set forth.

In testimony whereof I hereuno affix my signature.

JOHN A. McGREW.